(12) United States Patent
Hirata et al.

(10) Patent No.: US 11,876,426 B2
(45) Date of Patent: Jan. 16, 2024

(54) HAPTIC ACTUATOR AND VIBRATING MOTOR WITH THROUGH HOLE

(71) Applicant: Nidec Corporation, Kyoto (JP)

(72) Inventors: Atsunori Hirata, Kyoto (JP); Hiroaki Hirano, Kyoto (JP); Ryoichi Mitsuhata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 95 days.

(21) Appl. No.: 17/547,301

(22) Filed: Dec. 10, 2021

(65) Prior Publication Data

US 2022/0209638 A1    Jun. 30, 2022

(30) Foreign Application Priority Data

Dec. 25, 2020   (JP) ................. 2020-217900

(51) Int. Cl.
*H02K 33/02*     (2006.01)
*G06F 3/01*      (2006.01)
*G06F 3/0354*    (2013.01)

(52) U.S. Cl.
CPC ............ *H02K 33/02* (2013.01); *G06F 3/016* (2013.01); *G06F 3/03545* (2013.01)

(58) Field of Classification Search
CPC .. H02K 7/1869; H02K 7/1876; H02K 7/1892; H02K 33/00; H02K 33/02; H02K 33/16; G06F 3/016; G06F 3/03545
USPC ........ 310/25, 15, 12.01, 81, 80, 321, 20, 21, 310/28–30, 36–37, 40 MM
See application file for complete search history.

(56) References Cited

U.S. PATENT DOCUMENTS

| | | | | |
|---|---|---|---|---|
| 6,323,568 B1 * | 11/2001 | Zabar | ................. | H02K 33/04 310/12.24 |
| 6,326,706 B1 * | 12/2001 | Zhang | ................. | F04B 35/045 310/12.32 |
| 6,644,943 B1 * | 11/2003 | Lilie | ................. | F04B 35/045 417/418 |
| 6,737,780 B1 * | 5/2004 | Fisher | ................. | H02K 1/17 310/154.14 |

(Continued)

FOREIGN PATENT DOCUMENTS

JP   08-065990 A   3/1996
JP   2006-183754 A   7/2006

OTHER PUBLICATIONS

JP2006183754A English Translation (Year: 2006).*

*Primary Examiner* — Maged M Almawri
(74) *Attorney, Agent, or Firm* — Keating & Bennett, LLP

(57) ABSTRACT

A vibrating motor includes a stationary portion, and a movable portion able to vibrate with respect to the stationary portion along a center axis extending in a vertical direction. The stationary portion includes a bearing portion which supports the movable portion to be able to vibrate along the center axis and has a tubular shape extending along the center axis, and a coil which directly or indirectly opposes at least a portion of the movable portion in a radial direction. A lower end portion of the bearing portion has a tubular shape extending along the center axis. A communication hole which penetrates in the vertical direction and allows an outside of the bearing portion and an inside of a portion above the lower end portion of the bearing portion to communicate with each other is provided on a radially inner side of the lower end portion.

11 Claims, 8 Drawing Sheets

(56) References Cited

U.S. PATENT DOCUMENTS

| | | | | |
|---|---|---|---|---|
| 7,078,832 B2* | 7/2006 | Inagaki | | H02K 7/14 |
| | | | | 335/238 |
| 7,316,545 B2* | 1/2008 | Lenke | | F04B 17/046 |
| | | | | 92/169.1 |
| 7,573,163 B2* | 8/2009 | Tu | | H02K 39/00 |
| | | | | 310/12.21 |
| 7,981,107 B2* | 7/2011 | Olsen | | A61M 5/14276 |
| | | | | 604/152 |
| 8,314,519 B2* | 11/2012 | Eckstein | | F16H 25/20 |
| | | | | 310/12.01 |
| 8,368,268 B2* | 2/2013 | Hasegawa | | G02B 21/248 |
| | | | | 359/381 |
| 8,446,055 B2* | 5/2013 | Jun | | H02K 33/16 |
| | | | | 310/23 |
| 9,004,883 B2* | 4/2015 | Neelakantan | | F04B 17/046 |
| | | | | 417/415 |
| 9,906,109 B2* | 2/2018 | Endo | | H02K 33/16 |
| 10,424,429 B2* | 9/2019 | Fatemi | | H01F 7/1607 |
| 10,447,133 B2* | 10/2019 | Jin | | H02K 33/18 |
| 10,547,233 B2* | 1/2020 | Jin | | H02K 5/04 |
| 10,566,888 B2* | 2/2020 | Degner | | H02K 33/18 |
| 10,890,169 B2* | 1/2021 | Jeong | | F04B 39/0061 |
| 11,031,857 B2* | 6/2021 | Wasenczuk | | H02N 2/186 |
| 11,152,843 B2* | 10/2021 | Wasenczuk | | H02K 1/34 |
| 11,309,808 B1* | 4/2022 | Li | | H02K 35/02 |
| 2002/0195884 A1* | 12/2002 | Ichii | | A61C 17/34 |
| | | | | 310/15 |
| 2004/0119343 A1* | 6/2004 | Ueda | | G10K 9/18 |
| | | | | 310/12.31 |
| 2004/0128781 A1* | 7/2004 | Kunita | | H02K 33/08 |
| | | | | 15/22.2 |
| 2004/0241017 A1* | 12/2004 | Buzzi | | F04B 19/006 |
| | | | | 417/415 |
| 2005/0089418 A1* | 4/2005 | Bonfardeci | | F04B 17/046 |
| | | | | 417/417 |
| 2009/0051471 A1* | 2/2009 | Zhao | | H01F 7/1607 |
| | | | | 335/261 |
| 2009/0232666 A1* | 9/2009 | Choi | | H02K 33/16 |
| | | | | 417/212 |
| 2011/0133577 A1* | 6/2011 | Lee | | H02K 33/18 |
| | | | | 310/15 |
| 2011/0198949 A1* | 8/2011 | Furuich | | H02K 33/16 |
| | | | | 310/25 |
| 2011/0316361 A1* | 12/2011 | Park | | H02K 33/16 |
| | | | | 310/25 |
| 2013/0169071 A1* | 7/2013 | Endo | | H02K 33/12 |
| | | | | 310/25 |
| 2014/0035397 A1* | 2/2014 | Endo | | H02K 33/18 |
| | | | | 310/30 |
| 2014/0062225 A1* | 3/2014 | Kim | | H02K 33/00 |
| | | | | 310/15 |
| 2014/0077628 A1* | 3/2014 | Yamada | | H02K 33/12 |
| | | | | 310/12.16 |
| 2014/0084710 A1* | 3/2014 | Endo | | H02K 33/16 |
| | | | | 310/25 |
| 2015/0137628 A1* | 5/2015 | Endo | | H02K 33/16 |
| | | | | 310/25 |
| 2015/0206639 A1* | 7/2015 | Odajima | | B06B 1/045 |
| | | | | 335/235 |
| 2016/0094115 A1* | 3/2016 | Okawa | | A61C 17/3445 |
| | | | | 310/25 |
| 2016/0164389 A1* | 6/2016 | Jang | | H02K 7/116 |
| | | | | 310/20 |
| 2017/0070131 A1* | 3/2017 | Degner | | H02K 33/00 |
| 2017/0214306 A1* | 7/2017 | Katada | | H02K 33/16 |
| 2018/0056329 A1* | 3/2018 | Akanuma | | H02K 33/16 |
| 2018/0219465 A1* | 8/2018 | Katada | | B06B 1/045 |
| 2018/0250107 A1* | 9/2018 | Dai | | H02K 1/2791 |
| 2019/0044425 A1* | 2/2019 | Zu | | H02K 33/02 |
| 2019/0151895 A1* | 5/2019 | Takahashi | | H02K 33/18 |

* cited by examiner

HAPTIC ACTUATOR AND VIBRATING MOTOR WITH THROUGH HOLE

CROSS-REFERENCE TO RELATED APPLICATIONS

The present application claims priority under 35 U.S.C. § 119 to Japanese Patent Application No. 2020-217900, filed on Dec. 25, 2020, the entire contents of which are hereby incorporated herein by reference.

1. FIELD OF THE INVENTION

The present disclosure relates to a vibrating motor and a haptic device.

2. BACKGROUND

Conventionally, various devices such as portable devices like smartphones have been provided with a vibrating motor as a vibration generator. The vibrating motor is used for a function of notifying the user of an incoming call, an alarm, or the like, or a function of haptic feedback in a human interface, for example.

A vibrating motor includes a case, a coil, an elastic portion, and a movable portion. The movable portion includes a magnet. The movable portion and the case are often connected by an elastic portion. When the coil is energized to generate a magnetic field, the movable portion vibrates.

Here, in a case where the movable portion is not supported in the radial direction orthogonal to the vibration direction, there is a possibility that the manufacturing efficiency of the vibrating motor decreases in order to accurately arrange the movable portion in the radial direction.

SUMMARY

An example embodiment of a vibrating motor of the present disclosure includes a stationary portion, and a movable portion able to vibrate with respect to the stationary portion along a center axis extending in a vertical direction. The stationary portion includes a bearing portion which supports the movable portion to be able to vibrate along the center axis and has a tubular shape extending along the center axis, and a coil which directly or indirectly opposes at least a portion of the movable portion in a radial direction. A lower end portion of the bearing portion has a tubular shape extending along the center axis. A communication hole which penetrates in the vertical direction and allows an outside of the bearing portion and an inside of a portion above the lower end portion of the bearing portion to communicate with each other is provided on a radially inner side of the lower end portion. At least a portion of a lower surface of the movable portion overlaps the communication hole in the vertical direction.

The above and other elements, features, steps, characteristics and advantages of the present disclosure will become more apparent from the following detailed description of the example embodiments with reference to the attached drawings.

DETAILED DESCRIPTION

Figure 1:
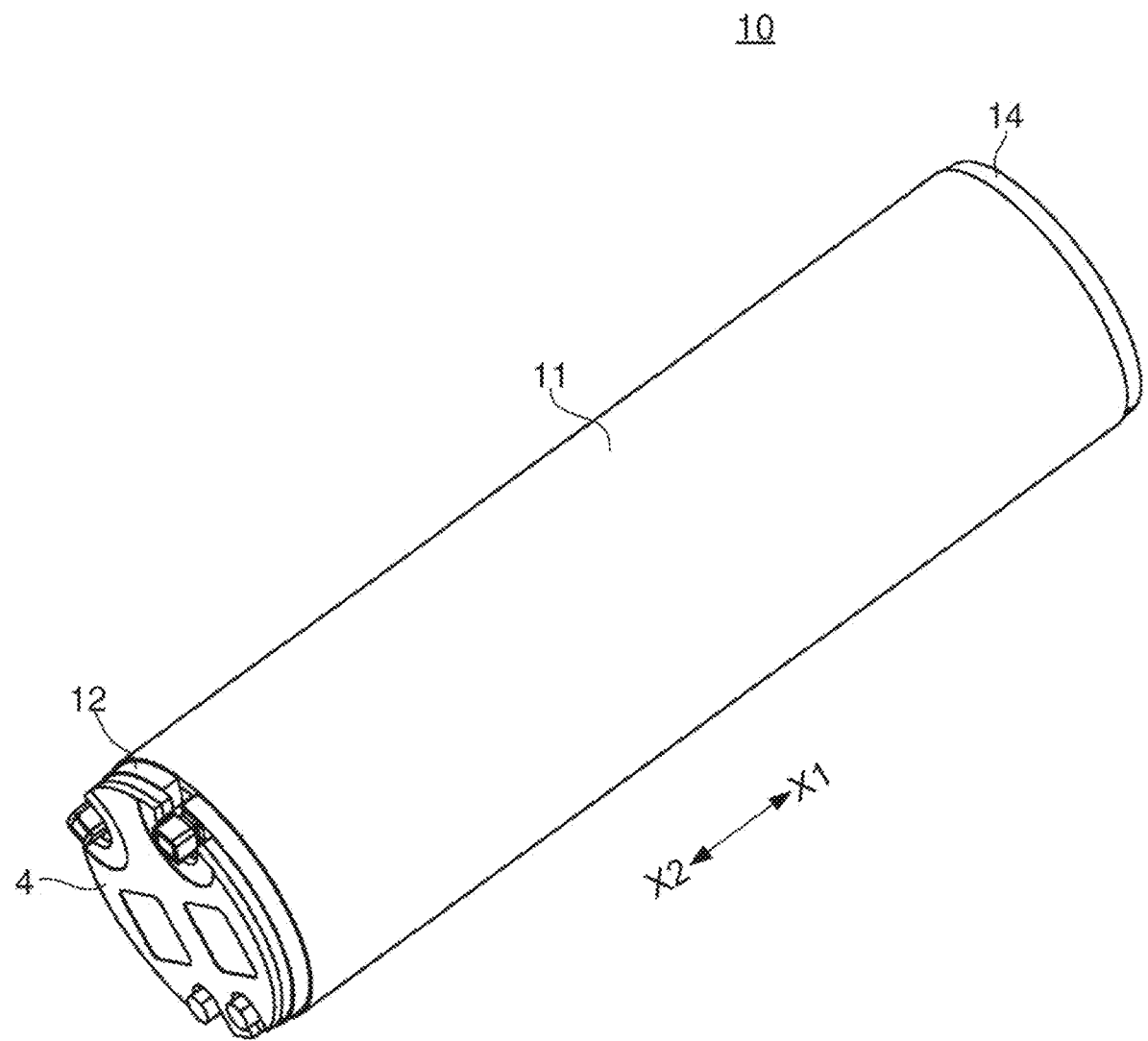
FIG. 1 is a perspective view of a vibrating motor according to an example embodiment of the present disclosure.

Example embodiments of the present disclosure will be described hereinbelow with reference to the drawings.

Incidentally, in the drawings, a direction in which a center axis J of a vibrating motor 10 extends is referred to as a "vertical direction", an upper side is referred to as X1, and a lower side is referred to as X2. Incidentally, the vertical direction does not limit the attaching direction of the vibrating motor 10 when the vibrating motor 10 is mounted on a device.

A radial direction with respect to the center axis J is simply referred to as a "radial direction", a direction approaching the center axis J is referred to as a radially inward direction, and a direction away from the center axis J is referred to as a radially outward direction.

Figure 2:
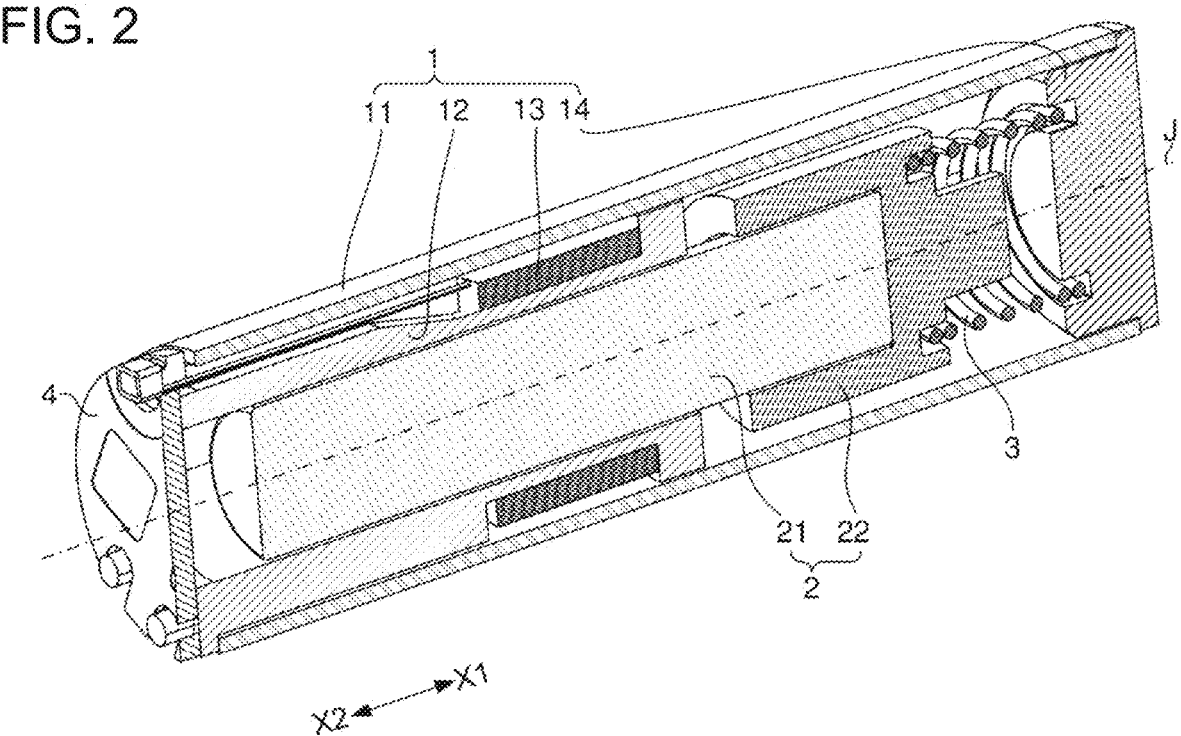
FIG. 2 is a longitudinal sectional perspective view of a vibrating motor according to an example embodiment of the present disclosure.
Figure 3:
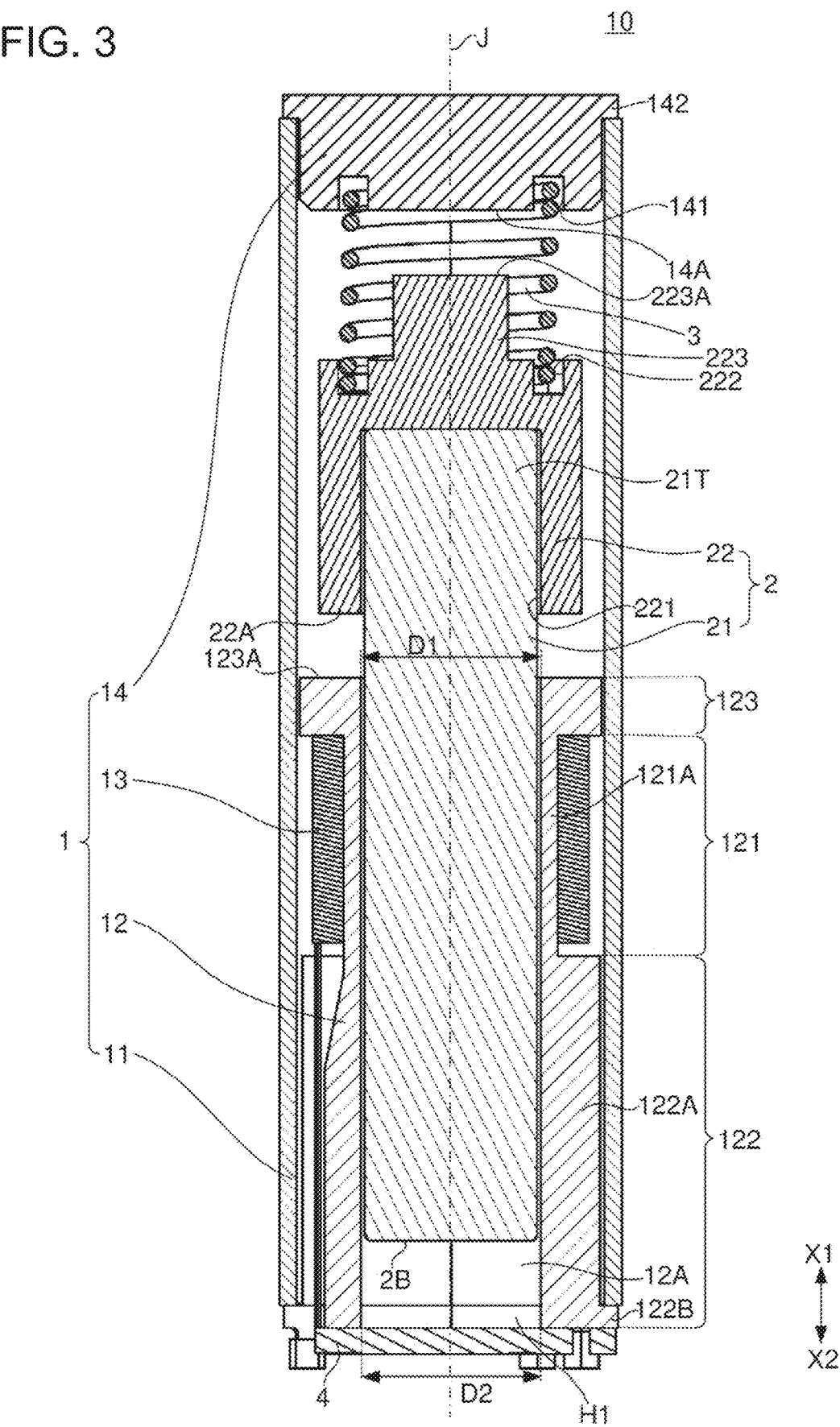
FIG. 3 is a longitudinal sectional view of a vibrating motor according to an example embodiment of the present disclosure.

FIG. 1 is a perspective view of the vibrating motor 10 according to an example embodiment of the present disclosure; FIG. 2 is a longitudinal sectional perspective view of the vibrating motor 10 illustrated in FIG. 1. FIG. 3 is a longitudinal sectional view of the vibrating motor 10 illustrated in FIG. 1.

The vibrating motor 10 includes a stationary portion 1 and a movable portion 2. In this example embodiment, the vibrating motor 10 further includes an elastic portion 3 and a board 4. The movable portion 2 extends along the center axis J. The movable portion 2 can vibrate with respect to the stationary portion 1 along the center axis J. The center axis J extends in the vertical direction.

The stationary portion 1 includes a bearing portion 12 and a coil 13. In this example embodiment, the stationary portion 1 further includes a housing 11 and a top surface portion 14.

The housing 11 is a cylindrical member extending in the vertical direction. Incidentally, the housing 11 is not limited to the cylindrical shape, and may have, for example, a quadrangular tubular shape or the like. That is, it is sufficient if the housing 11 has a tubular shape extending in the vertical direction. The housing 11 is made of a magnetic material. The magnetic material is stainless steel, for example. The housing 11 houses the movable portion 2 and the elastic portion 3. In this example embodiment, the housing 11 further houses the bearing portion 12 to be described later.

The bearing portion 12 is a tubular sleeve bearing extending along the center axis J. The bearing portion 12 is made of, for example, a resin having a low friction coefficient and a low wear property. The resin is, for example, polyacetal (POM).

The bearing portion 12 has a hollow portion 12A extending in the vertical direction. The bearing portion 12 includes a first region 121, a second region 122, and a third region 123. The second region 122 is arranged below the first region 121. The third region 123 is arranged above the first region 121.

The first region 121, the second region 122, and the third region 123 are integrally formed. That is, the bearing portion 12 is formed by integral molding. In the configuration illustrated in FIG. 3, an inner diameter D1 at the upper end of the bearing portion 12 is smaller than an inner diameter D2 at the lower end of the bearing portion 12. The inner diameter D1 is slightly smaller than the inner diameter D2. As a result, it becomes easy to remove a mold downward at the time of manufacturing the bearing portion 12 by integral molding. Further, when the movable portion 2 vibrates in the vertical direction, the region close to the center of the movable portion 2 in the vertical direction is supported by the upper end of the bearing portion 12, so that the movable portion 2 can be suppressed from swinging in the radial direction from the center axis J, and thus the vibration of the movable portion 2 is stabilized.

More specifically, the inner diameter of the bearing portion 12 continuously increases from the inner diameter D1 toward the inner diameter D2. In FIG. 3, the outer edge of the hollow portion 12A is linearly inclined downward and radially outward. That is, the inner diameter of the bearing portion 12 continuously increases toward the lower side. As a result, the manufacturing of a mold for manufacturing the bearing portion 12 is facilitated.

Incidentally, for example, a plurality of regions having a constant inner diameter in the vertical direction may be arranged in the vertical direction from the inner diameter D1 to the inner diameter D2, and the inner diameter may be discontinuously increased toward the lower side. This also makes it easy to remove the mold downward.

The first region 121 has a cylindrical shape extending in the vertical direction. A conductive wire is wound around the radially outer periphery of the first region 121 to form the coil 13. The coil 13 is formed by winding a conductive wire around the center axis J. The radially inner surface of the coil 13 is in contact with the radially outer surface of the first region 121. That is, the first region 121 includes a coil inner region 121A arranged on the radially inner side of the coil 13.

The radially outer end position of the first region 121 coincides with the radially inner end position of the coil 13. As a result, at the time of manufacturing the vibrating motor 10, the coil 13 can be wound around the first region 121 after the bearing portion 12 is formed, and thus the manufacturing cost can be reduced.

The second region 122 includes a cylindrical bearing cylinder portion 122A extending in the vertical direction and a lower end portion 122B arranged below the bearing cylinder portion 122A. That is, the bearing portion 12 includes the bearing cylinder portion 122A. The bearing cylinder portion 122A has a tubular shape extending in the vertical direction. The bearing portion 12 has the lower end portion 122B. The lower end portion 122B has a tubular shape extending along the center axis J. More specifically, the lower end portion 122B has a cylindrical shape. The radially outer end of the lower end portion 122B is arranged on the radially outer side relative to the radially outer end of the bearing cylinder portion 122A. At the time of manufac-turing the vibrating motor 10, the bearing portion 12 is inserted into the housing 11 from below. By the insertion, the upper surface at the radially outer end portion of the lower end portion 122B comes into contact with the lower surface of the housing 11 in the vertical direction. As a result, the bearing portion 12 can be positioned with respect to the housing 11 in the vertical direction.

A space surrounded by the radially inner surface of the lower end portion 122B is a communication hole H1. The communication hole H1 corresponds to a lower end portion of the hollow portion 12A. That is, the communication hole H1 which penetrates in the vertical direction and allows the outside of the bearing portion 12 and the inside of a portion of the bearing portion 12 above the lower end portion 122B to communicate with each other is provided on the radially inner side of the lower end portion 122B. The reason for providing the communication hole H1 will be described later.

At the boundary between the lower end portion 122B and the upper portion of the bearing portion 12 above the lower end portion 122B, the inner diameter of the lower end portion 122B (the outer diameter of the communication hole H1) and the inner diameter of the upper portion are the same. That is, the outer diameter of the movable portion 2, the inner diameter of the bearing portion 12, and the inner diameter of the lower end portion 122B of the bearing portion 12 configuring the communication hole H1 are substantially the same. As a result, the bearing portion 12 including the lower end portion 122B can be integrally molded.

In a state where the bearing portion 12 is housed in the housing 11, the housing 11 is arranged on the radially outer side relative to the radially outer end of the coil 13.

The radially outer surface of the bearing cylinder portion 122A is arranged on the radially outer side relative to the radially outer surface of the coil 13. That is, the radially outer surface of the second region 122 is arranged on the radially outer side relative to the radially outer surface of the first region 121. The upper surface of the second region 122 is arranged to face the lower end of the coil 13 in the vertical direction. As a result, the coil 13 can be suppressed from moving downward from the upper surface of the second region 122.

The third region 123 has a cylindrical shape extending in the vertical direction. The radially outer end of the third region 123 is arranged on the radially outer side relative to the radially inner end of the coil 13. The lower surface of the third region 123 is arranged to face the upper end of the coil 13 in the vertical direction. The third region 123 is a flange portion. As a result, the coil 13 can be suppressed from moving upward from the lower surface of the third region 123.

The movable portion 2 includes a core portion 21 and a holding portion 22.

The core portion 21 is a columnar member extending along the axial direction. In this example embodiment, the core portion 21 includes, for example, two magnets arranged in the vertical direction, and a magnetic body vertically sandwiched by the magnets. In this case, for example, the lower side of the upper magnet is the N pole, and the upper side is the S pole. The upper side of the lower magnet is the N pole, and the lower side is the S pole. That is, the N poles face each other in the vertical direction with the magnetic body interposed therebetween. When the housing 11 is made of a magnetic material, it is possible to suppress leakage of the magnetic field generated by the magnet and the coil 13 to the outside of the vibrating motor 10 and to increase a magnetic force. Incidentally, the magnetic pole of each magnet may be opposite to the above in the vertical direction.

The holding portion 22 holds an upper end portion 21T of the core portion 21. The holding portion 22 has a columnar recess 221 recessed upward in a columnar shape. The upper end portion 21T is arranged in the columnar recess 221. The upper end portion 21T is fixed to the columnar recess 221 by, for example, adhesion. That is, the holding portion 22 is fixed to the core portion 21.

The holding portion 22 functions as a weight and is made of metal, for example. An example of the metal is a tungsten alloy.

The holding portion 22 has an annular recess 222 recessed downward in an annular shape from the upper surface. The lower end portion of the elastic portion 3 is fixed to the annular recess 222. The elastic portion 3 is fixed to the annular recess 222 by welding or adhesion, for example. That is, the elastic portion 3 is arranged above the movable portion 2. An upper end portion of the movable portion 2 is fixed to a lower end portion of the elastic portion 3.

The top surface portion 14 is a substantially disk-shaped lid member centered on the center axis J. The top surface portion 14 has an annular recess 141 which is annularly recessed upward from the lower surface. The upper end portion of the elastic portion 3 is fixed to the annular recess 141. The elastic portion 3 is fixed to the annular recess 141 by welding or adhesion, for example. That is, the top surface portion 14 is fixed to the upper end portion of the elastic portion 3.

The top surface portion 14 has a top surface flange portion 142 protruding in the radial direction. At the time of manufacturing the vibrating motor 10, the top surface portion 14 is inserted into the housing 11 from above. At this time, the lower surface of the top surface flange portion 142 is in contact with the upper surface of the housing 11 in the vertical direction. As a result, the top surface portion 14 can be positioned in the vertical direction with respect to the housing 11, and the strength of the vibrating motor 10 can be improved. The top surface portion 14 is fixed to the upper end portion of the housing 11.

With such a configuration, the movable portion 2 is supported by the top surface portion 14 with the elastic portion 3 interposed therebetween. In a state where the elastic portion 3 has a natural length, as illustrated in FIG. 3, a lower part of the core portion 21 is housed in the hollow portion 12A of the bearing portion 12. As a result, the core portion 21 is supported by the bearing portion 12 so as to be able to vibrate along the center axis J. That is, the bearing portion 12 supports the movable portion 2 so as to be able to vibrate along the center axis J. That is, the bearing portion 12 supports the movable portion 2 so as to be able to vibrate along the center axis J, and has a tubular shape extending along the center axis J. More specifically, the core portion 21 partially faces the third region 123, the first region 121, and the bearing cylinder portion 122A in the radial direction on the radially inner side of the third region 123, the first region 121, and the bearing cylinder portion 122A, respectively. That is, the bearing cylinder portion 122A is arranged to face the movable portion 2 in the radial direction. That is, the bearing portion 12 extends along the center axis J and supports the movable portion 2 so as to be able to vibrate along the center axis J. Further, the radially outer surface on the lower side of the movable portion 2 is supported by the bearing portion 12, but the lower side of the movable portion 2 is not supported in the axial direction. As a result, as compared with a case where the movable portion is supported by an elastic portion or the like from both sides of the vertical direction, it is possible to suppress the restoring force of the movable portion in the vertical direction from becoming larger than necessary. Therefore, the vibration of the movable portion in the vertical direction can be increased. Further, since it is not necessary to arrange the elastic portion below the movable portion 2, the configuration of the vibrating motor 10 is simplified, and mass productivity is improved.

The stationary portion 1 includes the coil 13. In a state where the elastic portion 3 has a natural length, as illustrated in FIG. 3, a part of the core portion 21 faces the coil 13 in the radial direction with the coil inner region 121A interposed therebetween. That is, the coil 13 indirectly faces at least a part of the movable portion 2 in the radial direction. Incidentally, the bearing portion may be provided below the coil, and the coil may directly face at least a part of the movable portion in the radial direction.

When the coil 13 is energized, a magnetic field is generated from the coil 13. The movable portion 2 vibrates in the vertical direction by the interaction between the generated magnetic field and the magnetic field by the core portion 21.

Since the first region 121 includes the coil inner region 121A, the movable portion 2 and the coil 13 can be separated by the coil inner region 121A. As a result, the radial thickness of the coil inner region 121A can be reduced, and the vibrating motor 10 can be downsized in the radial direction.

The second region 122 is arranged below the lower end of the coil 13. Therefore, by providing the bearing portion 12 with the second region 122 in addition to the first region 121, the vertical length of the inner surface of the bearing portion 12 radially facing the movable portion 2 is increased, and the inclination of the movable portion 2 during vibration can be suppressed. As a result, the vibration can be stabilized.

As illustrated in FIG. 3, in a state where the elastic portion 3 has a natural length, a part of the movable portion 2 is arranged on the radially inner side of each of the radially inner surface of the first region 121 and the radially inner surface of the second region 122. As a result, the vertical length of the movable portion 2 radially facing the inner surface of the bearing portion 12 is increased, and the inclination of the movable portion 2 at the time of vibration can be suppressed. Therefore, the vibration of the movable portion 2 is stabilized. Incidentally, in a state where the elastic portion 3 has a natural length, a part of the movable portion 2 may not be positioned on the radially inner side of the second region 122.

The bearing portion 12 has the third region 123 arranged above the first region 121. As a result, the vertical length of the inner surface of the bearing portion 12 radially facing the movable portion 2 is increased, and the inclination of the movable portion 2 at the time of vibration can be further suppressed. Incidentally, the radially outer end of the third region 123 may be arranged on the radially inner side relative to the radially inner end of the coil 13.

A lower surface 22A of the holding portion 22 is arranged to directly face an upper surface 123A of the third region 123 in the vertical direction. That is, the movable portion 2 has the surface 22A which is arranged to directly face the upper surface 123A of the third region 123 in the vertical direction. As a result, the surface 22A of the movable portion 2 can come into contact with the upper surface 123A of the third region 123, and the downward movement of the movable portion 2 can be restricted. In particular, the downward movement of the movable portion 2 is restricted as described above, so that the movable portion 2 can be suppressed from coming out below the second region 122. Further, as will be described later, when the board 4 is arranged below the second region 122, the movable portion 2 can be suppressed from coming into contact with the board 4.

As illustrated in FIG. 3, the holding portion 22 has a protruding portion 223 protruding upward. The protruding portion 223, that is, the upper surface 223A of the holding portion 22 is arranged to directly face the lower surface 14A of the top surface portion 14 in the vertical direction. As a result, the upper surface 223A of the holding portion 22 can come into contact with the lower surface 14A of the top surface portion 14, and the upward movement of the movable portion 2 can be restricted.

Figure 4:
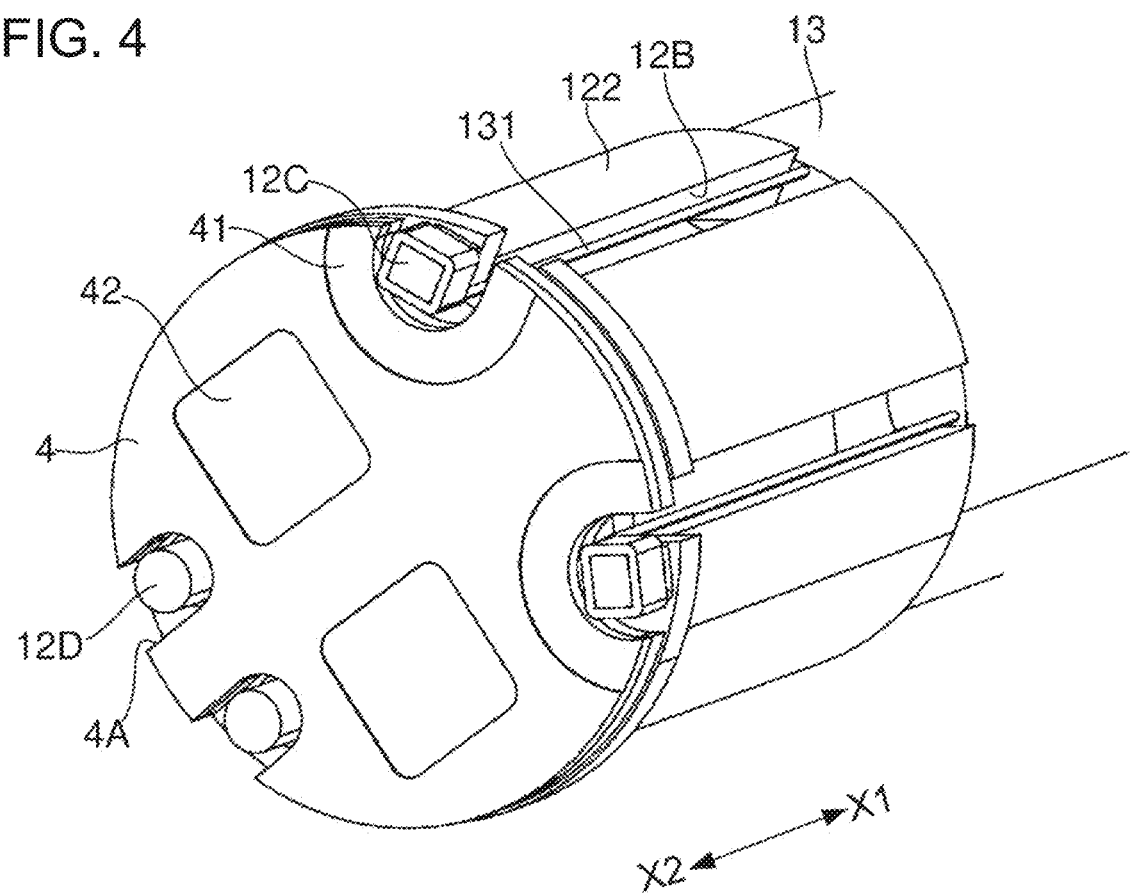
FIG. 4 is a perspective view illustrating a configuration related to an electrical connection between a board and a coil according to an example embodiment of the present disclosure.

FIG. 4 is a perspective view illustrating a configuration related to electrical connection between the board 4 and the coil 13. As illustrated in FIG. 4, a recess 12B extending in the vertical direction and recessed radially inward is formed on the radially outer surface of the second region 122 in the bearing portion 12. A part of the lead wire 131 drawn out from the coil 13 is housed in the recess 12B. Incidentally, the entire lead wire 131 may be housed in the recess 12B. That is, it is sufficient if at least a part of the lead wire 131 is housed in the recess 12.

As a result, it is not necessary to route the lead wire 131 radially outward of the bearing portion 12. Therefore, as compared with a case where the lead wire 131 is routed radially outward of the bearing portion 12, in the vibrating motor 10, the lead wire 131 can be suppressed from interfering with other portions or other members, and the vibrating motor 10 can be downsized in the radial direction. Further, the manufacturing efficiency of the vibrating motor 10 is improved.

Further, as illustrated in FIG. 4, the board 4 is arranged below the second region 122. The board 4 expands in the radial direction. That is, the board 4 expands in a direction intersecting the center axis J. The board 4 may be a flexible printed circuit board or a rigid printed circuit board.

The bearing portion 12 has a protruding portion 12C protruding downward from the lower surface of the second region 122. The lower end portion of the lead wire 131 drawn out downward is wound around the protruding portion 12C. That is, the lead wire 131 is tied to the protruding portion 12C.

The board 4 includes a first electrode portion 41 and a second electrode portion 42. The first electrode portion 41 and the second electrode portion 42 are electrically connected by a wiring pattern (not illustrated in FIG. 4) inside the board 4. At the time of manufacturing the vibrating motor 10, an operation of attaching the board 4 to the second region 122 and electrically connecting the first electrode portion 41 and the lead wire 131 tied to the protruding portion 12C by soldering or the like is performed. The operation may be performed automatically or manually. Therefore, the vibrating motor 10 can be manufactured with more excellent workability compared to the case of directly connecting the lead wire to the board. Further, with a mechanism of binding the lead wire 131 with the protruding portion 12C, the reliability of the electrical connection between the lead wire and the board 4 is improved even in a case where the outer diameter of the lead wire is small. Therefore, even in a case where the outer diameter of the lead wire is small or large, the reliability of the electrical connection between the lead wire and the board is improved. Thus, the outer diameter of the lead wire can be adjusted according to the application of the vibrating motor, and the electric resistance and output characteristics of the coil 13 can be easily adjusted.

In this manner, the lower end portion of the lead wire 131 drawn out downward from the coil 13 is electrically connected to the board 4. As a result, the routing of the lead wire 131 for electrically connecting the coil 13 and the board 4 is facilitated.

The board 4 has a plurality of notch portions 4A recessed from the radially outer edge of the board 4 in a direction of approaching the center axis J. The bearing portion 12 has a plurality of protruding portions 12D protruding downward from the lower surface of the second region 122. The plurality of protruding portions 12D are housed in the plurality of notch portions 4A. As a result, the board 4 can be positioned.

As illustrated in FIG. 3, the board 4 overlaps the communication hole H1 in the vertical direction in a state where the board 4 is attached to the lower end portion 122B. As a result, it is possible to suppress intrusion of foreign matter into the bearing portion 12.

Next, a method of manufacturing the vibrating motor 10 will be described.

At the time of manufacturing the vibrating motor 10, a configuration in which the housing 11, the bearing portion 12, and the coil 13 are integrated is assembled in advance as a first unit U1. On the other hand, a configuration in which the core portion 21, the holding portion 22, the elastic portion 3, and the top surface portion 14 are integrated is assembled in advance as a second unit U2.

Figure 5:
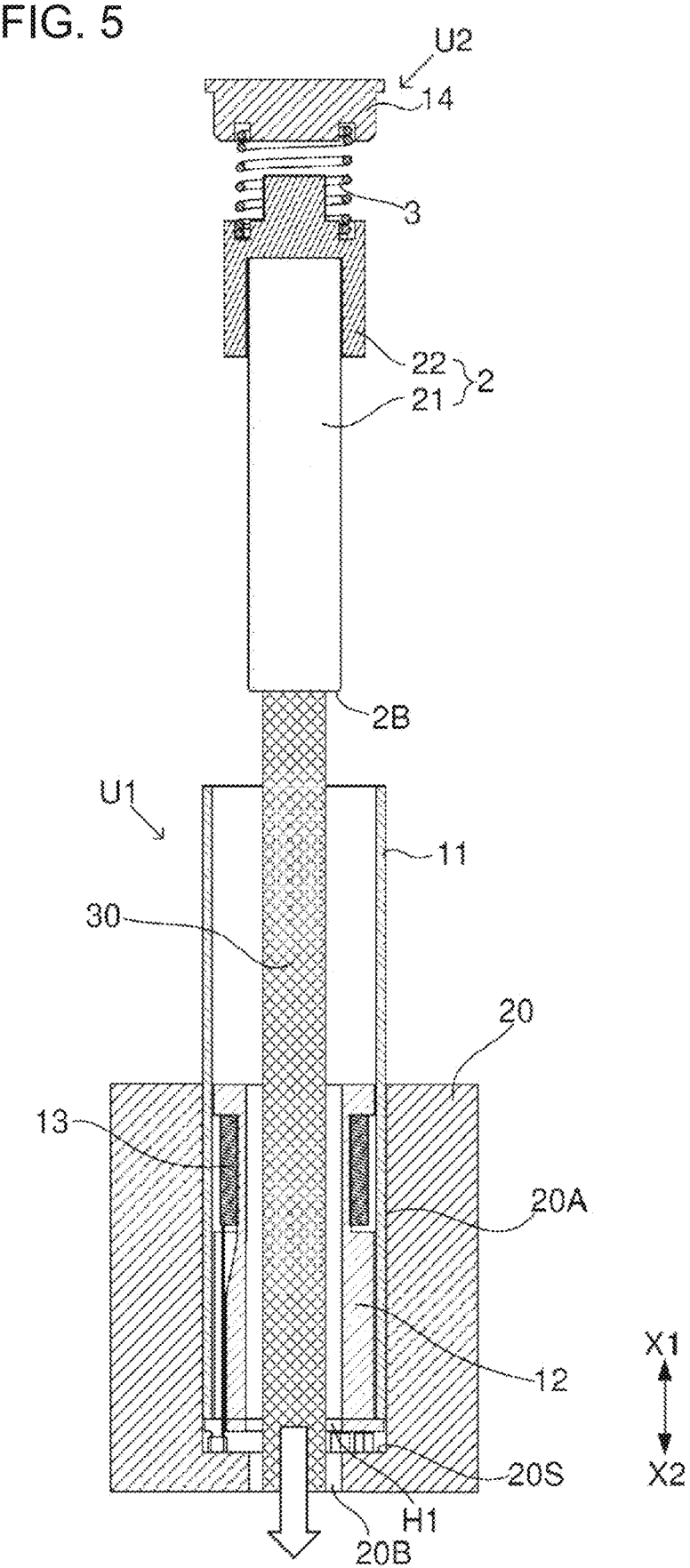
FIG. 5 is a sectional view illustrating a step in a manufacturing process of a vibrating motor according to an example embodiment of the present disclosure.

Then, as illustrated in FIG. 5, the first unit U1 is installed on a jig 20. The jig 20 has a recess 20A which is recessed in a columnar shape downward from the upper surface of the jig 20, and a through-hole 20B which penetrates from the recess 20A to the lower surface of the jig 20. The center axis of the recess 20A and the center axis of the through-hole 20B coincide with each other. The outer diameter of the recess 20A is substantially the same as the outer diameter of the housing 11. The outer diameter of the through-hole 20B is smaller than the outer diameter of the recess 20A.

When the first unit U1 is installed in the jig 20, the lower side of the first unit U1 is inserted into the recess 20A, and the bottom surface of the first unit U1 is brought into contact with a boundary surface 20S between the recess 20A and the through-hole 20B. The boundary surface 20S is an upper surface of a portion in which a tubular portion of the jig 20 configuring the recess 20A protrudes radially inward.

Then, a bar-shaped jig 30 is inserted into the jig 20 through the through-hole 20B. The jig 30 is inserted upward in the order of the inside of the bearing portion 12 and the inside of the housing 11, and is fixed to a lower surface 2B of the movable portion 2 (core portion 21) in the second unit U2 outside the housing 11. FIG. 5 illustrates this fixed state.

In a case where the jig 30 is made of a magnetic material, the jig 30 is fixed to the lower surface 2B by bringing the jig 30 into contact with the lower surface 2B. Further, in a case where the jig 30 is made of a non-magnetic material, the upper surface of the jig 30 and the lower surface 2B are fixed with an instantaneous adhesive. Incidentally, the upper surface of the jig 30 and the lower surface 2B may be fixed by another method.

After the jig 30 and the movable portion 2 are fixed, the jig 30 is pulled downward as indicated by an arrow in FIG. 5. As a result, the second unit U2 is pulled downward together with the jig 30, and the core portion 21 is inserted into the housing 11 from above. When the jig 30 is continuously pulled downward, the core portion 21 is inserted into the bearing portion 12.

At least a part of the lower surface 2B of the movable portion 2 overlaps the communication hole H1 in the vertical direction. Here, as illustrated in FIG. 3, in this example embodiment, the entire lower surface 2B of the movable portion 2 (core portion 21) overlaps the communication hole H1 in the vertical direction. The entire lower surface 2B vertically overlapping the communication hole H1 means that in a case where the radially outer edge of the communication hole H1 is projected upward, the entire lower surface 2B is included in the projected radially outer edge. As a result, the jig 30 can be inserted into the bearing portion 12 from the communication hole H1, the jig 30 can be fixed to the lower surface 2B, and the movable portion 2 can be pulled downward by the jig 30 and arranged inside the bearing portion 12.

When the core portion 21 is pulled into the bearing portion 12, the holding portion 22 and the elastic portion 3 are inserted into the housing 11, and the top surface portion 14 can be fitted into the upper end portion of the housing 11. After the top surface portion 14 is attached to the housing 11, the jig 30 is detached from the movable portion 2 by inclining the jig 30. Incidentally, another method may be used to detach the jig 30 from the movable portion 2.

As described above, the manufacturing efficiency of the vibrating motor 10 can be improved by using the jig. At this time, the movable portion 2 is arranged in the bearing portion 12, and thus the movable portion 2 can be accurately arranged in the radial direction.

Incidentally, in a case where the housing 11 is made of a magnetic material, and the jig 30 made of a magnetic material and the movable portion 2 are connected only by a magnetic force, there is a possibility that the core portion 21 is detached from the jig 30 and adsorbed to the housing 11 by an attractive force. Therefore, in such a case, it is desirable to fix the jig 30 made of a non-magnetic material and the movable portion 2 with an instantaneous adhesive.

Incidentally, the inner diameter D1 at the upper end of the bearing portion 12 may be larger than the inner diameter D2 at the lower end of the bearing portion 12. In this case, it is easy to remove the mold upward with respect to the bearing portion 12 at the time of manufacturing the bearing portion 12. Further, when the movable portion 2 is drawn into the bearing portion 12 using a jig, the movable portion 2 is less likely to come into contact with the bearing portion 12.

Figure 6:
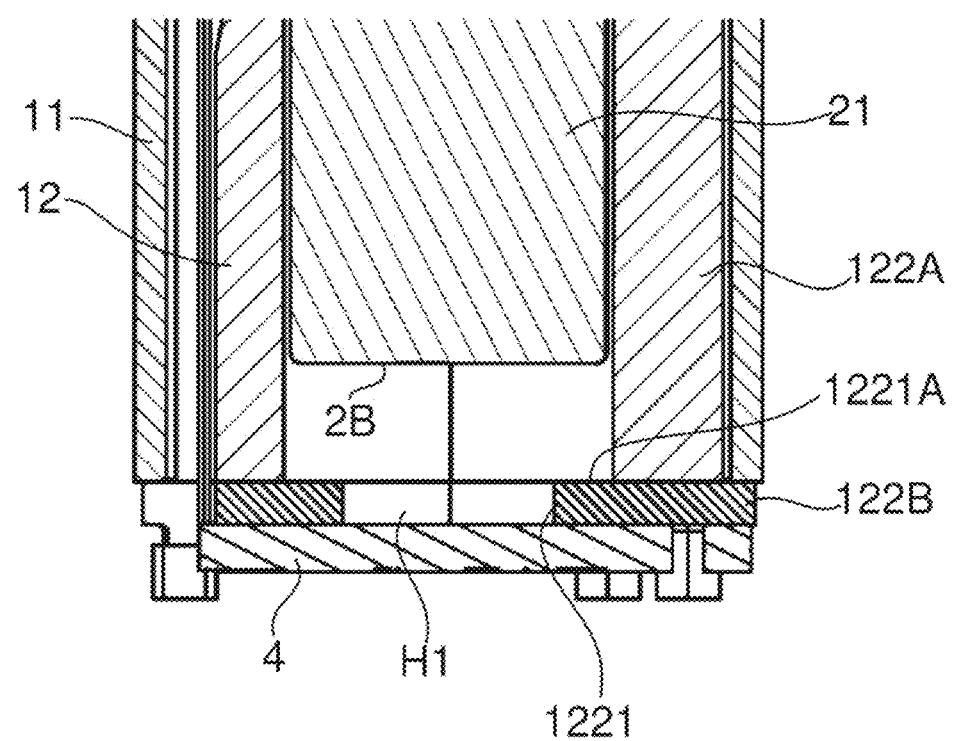
FIG. 6 is a longitudinal sectional view illustrating a partial configuration of a vibrating motor according to a modification of an example embodiment of the present disclosure.

FIG. 6 is a partial longitudinal sectional view of the lower side of the vibrating motor 10 according to a modification. As illustrated in FIG. 6, the bearing portion 12 includes the bearing cylinder portion 122A and the lower end portion 122B. The bearing cylinder portion 122A is similar to that of the above-described example embodiment. The lower end portion 122B is arranged below the bearing cylinder portion 122A and is a separate body from the bearing cylinder portion 122A. That is, the bearing portion 12 has the lower end portion 122B which is arranged below the bearing cylinder portion 122A and is a separate body from the bearing cylinder portion 122A.

The lower end portion 122B has the communication hole H1. The outer diameter of the communication hole H1 is smaller than the inner diameter of the lower end of the bearing cylinder portion 122A. A part of the lower surface 2B of the movable portion 2 (core portion 21) overlaps the communication hole H1 in the vertical direction. When a part of the lower surface 2B overlaps the communication hole H1 in the vertical direction, this means that the area of the communication hole H1 is smaller than the area of the lower surface 2B in the direction orthogonal to the center axis J, and when the radially outer edge of the communication hole H1 is projected upward, the inside of the radially outer edge overlaps the part of the lower surface 2B.

Even with such a configuration, similarly to the above-described example embodiment, it is possible to insert a jig into the communication hole H1, fix the jig to the lower surface 2B of the movable portion 2 in the second unit U2, pull the movable portion 2 by the jig, and arrange the movable portion 2 in the bearing portion 12. That is, it is sufficient if at least a part of the lower surface 2B of the movable portion 2 overlaps the communication hole H1 in the vertical direction.

Since the lower end portion 122B is a separate body, the communication hole H1 overlapping a part of the lower surface 2B of the movable portion 2 in the vertical direction is easily formed in the lower end portion 122B. In particular, in a case where the inner diameter D2 is larger than the inner diameter D1 (FIG. 3), when the bearing portion 12 including the lower end portion 122B having the communication hole H1 as described above is integrally formed with a mold, it is difficult to pull out the mold. Therefore, it is desirable that the lower end portion 122B be a separate body.

In the configuration illustrated in FIG. 6, the lower end portion 122B of the bearing portion 12 has an inward extending portion 1221 extending to the radially inner side relative to the radially inner end of the bearing cylinder portion 122A. An upper surface 1221A of the inward extending portion 1221 is arranged so as to face a part of the lower surface 2B of the movable portion 2 in the vertical direction. A part of the lower surface 2B has an annular shape. As a result, the board 4 can be fixed to the lower surface region facing the upper surface 1221A in the vertical direction with an adhesive or the like. Therefore, the board 4 can be firmly and easily fixed. Further, even in a case where a configuration in which the lower surface 22A of the holding portion 22 and the upper surface 123A of the third region 123 face each other in the vertical direction to restrict the downward movement of the movable portion 2 is not provided, the lower surface 2B of the movable portion 2 can come into contact with the upper surface 1221A, so that the downward movement of the movable portion 2 can be restricted.

Figure 7:
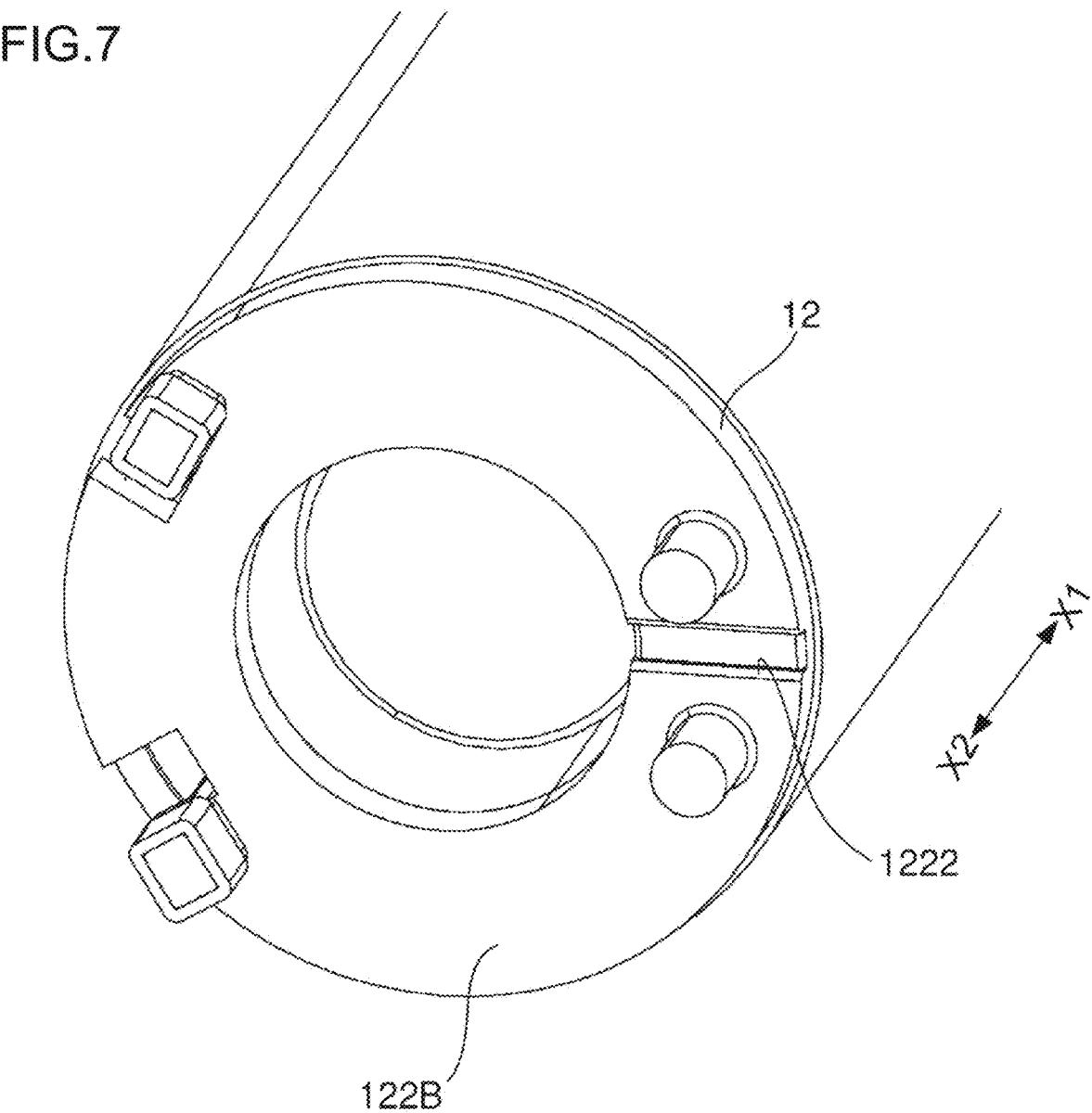
FIG. 7 is a perspective view illustrating a lower end portion of a bearing portion according to another modification of an example embodiment of the present disclosure.

FIG. 7 is a perspective view illustrating the lower end portion 122B of the bearing portion 12 according to another modification. FIG. 7 is a view of a state in which the board 4 is detached.

As illustrated in FIG. 7, a groove-shaped communication portion 1222 extending in the radial direction and recessed upward from the lower surface of the lower end portion 122B is formed in the lower end portion 122B. The communication portion 1222 allows the radially inner space and the radially outer space of the lower end portion 122B to communicate with each other. That is, the bearing portion 12 has the communication portion 1222 for communicating the radially inner space and the radially outer space of the bearing portion 12. As a result, in a case where the movable portion 2 vibrates up and down, the gas inside the bearing portion 12 is discharged to the outside of the bearing portion 12 through the communication portion 1222, so that it is possible to suppress a decrease in amplitude of vibration due to compression of the gas inside the bearing portion 12. Further, in the configuration in which the board 4 closes the lower side of the bearing portion 12 as in this example embodiment, a configuration in which the communication portion 1222 is provided is particularly useful.

Incidentally, the communication portion 1222 is not limited to the groove shape, and may be formed as, for example, a through-hole penetrating the bearing portion 12 in the radial direction.

Figure 8:
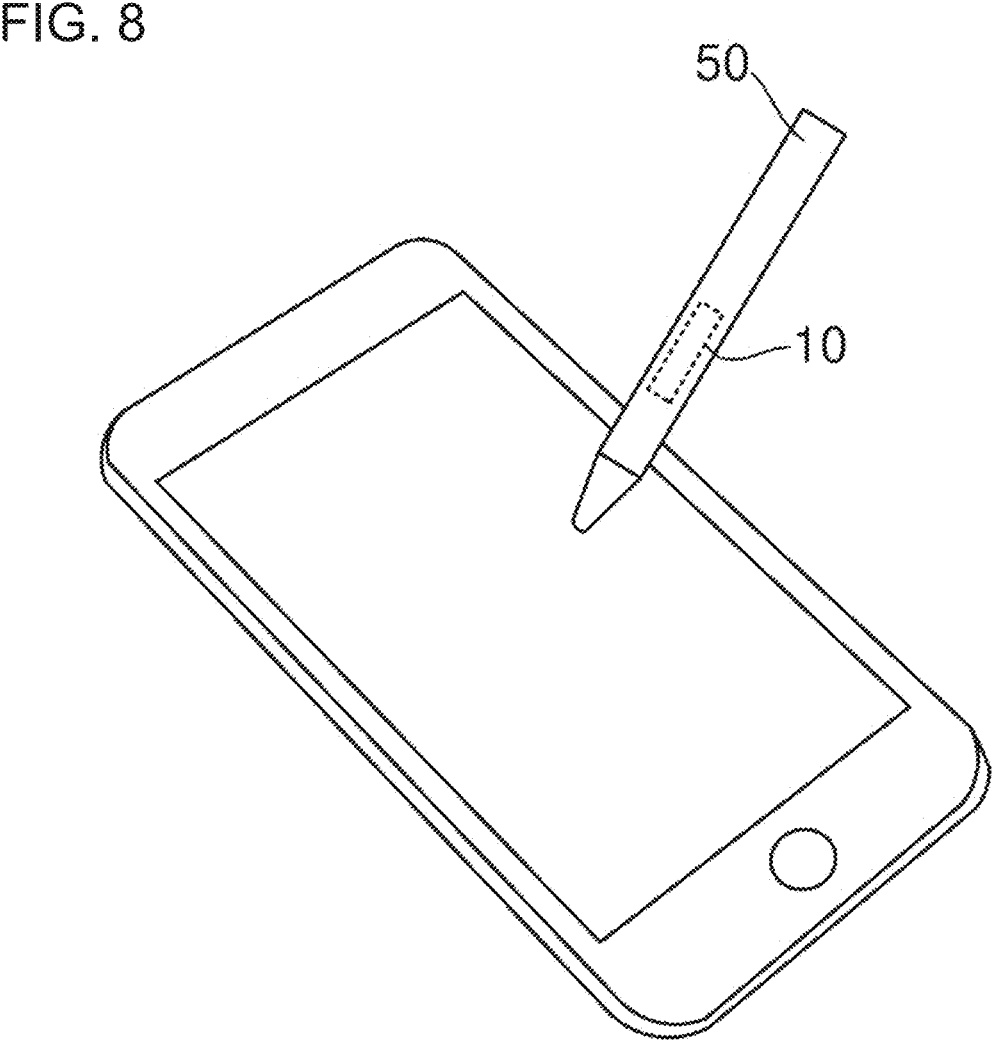
FIG. 8 is a view schematically illustrating a touch pen mounted with a vibrating motor according to an example embodiment of the present disclosure.

FIG. 8 is a view schematically illustrating a touch pen 50 as an example of a target device mounted with the vibrating motor 10. The touch pen 50 is a device which operates a device such as a smartphone or a tablet by being brought into contact with a touch panel of the device. When the touch pen 50 is mounted with the vibrating motor 10, the touch pen 50 can be vibrated to give haptic feedback to a user. That is, the touch pen 50 is an example of a haptic device including the vibrating motor 10. That is, the haptic device includes the vibrating motor 10. For example, the haptic feedback can give the user a feeling as if a character or the like is written on paper or the like with the touch pen 50. When the vibrating motor 10 is mounted in a haptic device, it is possible to realize a haptic device having the vibrating motor 10 with high manufacturing efficiency.

The target device is not limited to the touch pen, and various devices such as an aerial operation device can be mounted with the vibrating motor 10. For example, a device such as an electronic pen, an electronic writing instrument, or a mouse may be mounted with the vibrating motor 10, and the device may be used as an electronic device capable of inputting a stereoscopic image or a virtual reality image.

In particular, in a case where the vibrating motor 10 is mounted in a device such as a touch pen, it is necessary to reduce the size of the vibrating motor 10, but even the vibrating motor 10 having such a small size can be easily manufactured by using the jig as described above.

The present disclosure can be used for a vibrating motor mounted in various devices such as a touch pen, for example.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vibrating motor comprising:
   a stationary portion; and
   a movable portion able to vibrate with respect to the stationary portion along a center axis extending in a vertical direction; wherein
   the stationary portion includes:
      a bearing portion which supports the movable portion to be able to vibrate along the center axis and has a tubular shape extending along the center axis; and
      a coil which directly or indirectly opposes at least a portion of the movable portion in a radial direction;
   a lower end portion of the bearing portion has a tubular shape extending along the center axis;
   a communication hole which penetrates in the vertical direction and allows an outside of the bearing portion and an inside of a portion above the lower end portion of the bearing portion to communicate with each other is provided on a radially inner side of the lower end portion;
   at least a portion of a lower surface of the movable portion overlaps the communication hole in the vertical direction; and
   a groove-shaped communication portion extending in the radial direction and recessed upward from a lower surface of the lower end portion is defined in the lower end portion.

2. The vibrating motor according to claim 1, further comprising:
   an elastic portion that is above the movable portion; wherein
   an upper end portion of the movable portion is fixed to a lower end portion of the elastic portion; and
   the stationary portion includes:
      a housing which houses the movable portion and the elastic portion; and
      a top surface portion which is fixed to an upper end portion of the housing and fixed to an upper end portion of the elastic portion.

3. The vibrating motor according to claim 1, wherein an outer diameter of the movable portion, an inner diameter of the bearing portion, and an inner diameter of the lower end portion of the bearing portion configuring the communication hole are all equal or substantially equal.

4. The vibrating motor according to claim 1, wherein an inner diameter at an upper end of the bearing portion is larger than an inner diameter at the lower end portion of the bearing portion.

5. The vibrating motor according to claim 1, further comprising:
   a board which is below the bearing portion and expands in a direction intersecting the center axis; wherein
   the board overlaps the communication hole in the vertical direction.

6. A haptic device comprising:
   the vibrating motor according to claim 1.

7. The vibrating motor according to claim 1, wherein
   the bearing portion includes a bearing cylinder portion which opposes the movable portion in the radial direction and has a tubular shape extending in the vertical direction;
   the lower end portion of the bearing portion includes an inward extending portion extending to a radially inner side relative to a radially inner end of the bearing cylinder portion; and
   an upper surface of the inward extending portion opposes a portion of the lower surface of the movable portion in the vertical direction.

8. The vibrating motor according to claim 7, wherein the bearing portion includes the lower end portion which is below the bearing cylinder portion and is a separate structure from the bearing cylinder portion.

9. The vibrating motor according to claim 1, wherein an inner diameter at an upper end of the bearing portion is smaller than an inner diameter at the lower end portion of the bearing portion.

10. The vibrating motor according to claim 9, wherein the inner diameter of the bearing portion continuously increases toward a lower side.

11. The vibrating motor according to claim 9, wherein the bearing portion includes:
   a bearing cylinder portion which opposes the movable portion in the radial direction and has a tubular shape extending in the vertical direction; and
   the lower end portion which is below the bearing cylinder portion and is a separate structure from the bearing cylinder portion;
   the lower end portion of the bearing portion includes an inward extending portion extending to a radially inner side relative to a radially inner end of the bearing cylinder portion; and
   an upper surface of the inward extending portion opposes a portion of the lower surface of the movable portion in the vertical direction.

* * * * *